US012367503B1

(12) United States Patent
Stanfield et al.

(10) Patent No.: US 12,367,503 B1
(45) Date of Patent: *Jul. 22, 2025

(54) SYSTEM AND METHODS FOR MANAGEMENT DYNAMIC NUMBER INSERTION POOLS

(71) Applicant: CALLRAIL, INC., Atlanta, GA (US)

(72) Inventors: Miles Stanfield, Lilburn, GA (US); Man Chun Lam, Decatur, GA (US); Kristin Douglas, Atlanta, GA (US); Sean McCrohan, Sandy Spring, GA (US); Leonardo Peres, Maitland, FL (US); James Denton, Lawrenceville, GA (US); Elliot Wood, Atlanta, GA (US); Laura Lawrie, Atlanta, GA (US); Raed Badr, Atlanta, GA (US); Abhishek Chandrasekhar, Dunwoody, GA (US)

(73) Assignee: CALLRAIL, INC., Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/541,140

(22) Filed: Dec. 15, 2023

Related U.S. Application Data

(63) Continuation of application No. 18/187,394, filed on Mar. 21, 2023, now Pat. No. 11,900,398.

(60) Provisional application No. 63/483,657, filed on Feb. 7, 2023.

(51) Int. Cl.
*G06Q 30/0201* (2023.01)
*G06Q 30/0242* (2023.01)
*H04M 3/42* (2006.01)
*H04M 7/00* (2006.01)

(52) U.S. Cl.
CPC ..... *G06Q 30/0201* (2013.01); *G06Q 30/0244* (2013.01); *H04M 3/42068* (2013.01); *H04M 7/0036* (2013.01)

(58) Field of Classification Search
CPC .......... G06Q 30/0201; G06Q 30/0244; H04M 3/42068; H04M 7/0036
See application file for complete search history.

(56) References Cited

U.S. PATENT DOCUMENTS

| 10,013,700 | B1* | 7/2018 | Agrawal | H04M 3/42306 |
|---|---|---|---|---|
| 10,902,105 | B2 | 1/2021 | Strong et al. | |
| 2014/0229231 | A1 | 8/2014 | Lynn | |
| 2016/0373581 | A1* | 12/2016 | DiPietro | G06F 16/958 |
| 2017/0272571 | A1* | 9/2017 | Spiessbach | H04M 3/5175 |
| 2019/0287132 | A1 | 9/2019 | Linihan et al. | |

* cited by examiner

*Primary Examiner* — Charles N Appiah
*Assistant Examiner* — Nicole M Louis-Fils
(74) *Attorney, Agent, or Firm* — DLA Piper LLP (US)

(57) ABSTRACT

Systems and methods for managing dynamic number insertion pools are disclosed. Tracking re-use of a phone number in swaps, associated with a client pool, over a first period of time, may be performed. Based on the re-use, generating a risky swap value for the client pool may be done. In response to the risky swap value reaching a threshold, an assignment snapshot may be generated. A recommended value for a pool size may be generated based on the assignment snapshot.

20 Claims, 15 Drawing Sheets

| HTTP Method | Description |
|---|---|
| GET | Requests data from a target resource. Requests using GET always retrieve data. |
| POST | Submits data to create a resource. Requests using POST always create data. |
| PUT | Submits data to update a target resource. Requests using PUT always update data. |
| DELETE | Deletes the target resource. Requests using DELETE always delete data. |

FIG. 1

| Error Code | Meaning |
|---|---|
| 200 | OK — The request has succeeded. |
| 201 | Created — The request has been fulfilled and has resulted in a new resource being created. |
| 204 | No Content — The server successfully processed the request and is not returning any content. |
| 400 | Bad Request — The server cannot or will not process the request due to something that is perceived to be a client error (e.g., malformed request syntax, or invalid request parameters) |
| 401 | Unauthorized — The request has not been processed because it lacks a valid API key for the target resource. |
| 403 | Forbidden — The server understood the request but refuses to authorize it. |
| 404 | Not Found — The server did not find the target resource or endpoint. |
| 405 | Method Not Allowed — The HTTP method received in the request is known by the origin server but not supported by the target resource. |
| 406 | Not Acceptable — Request parameters were supplied in an unacceptable format. For requests, verify that parameters are sent as part of the URL. For other requests, verify that parameters are sent as JSON. |
| 422 | Unprocessable Entity — The server cannot or will not process the request due to something that is perceived to be a client error (e.g., malformed request syntax, or invalid request parameters) |
| 429 | Too many Requests — the User or Agency has sent too many requests in a given amount of time (See Rate Limiting.) |
| 500 | Internal Server Error — The server encountered an unexpected condition that prevented it from fulfilling the request. If this errors persists, please contact support. |
| 503 | Service Unavailable — The CallRail API is temporarily offline for maintenance, or the server is overloaded. Please try again later. |

FIG. 2

| API Type | Hourly Limit | Daily Limit |
|---|---|---|
| General API Requests | 1,000/hr | 10,000/day |
| SMS Send | 150/hour | 1,000/day |
| Outbound Call | 100/hour | 2,000/day |

FIG. 3

Example:
Curl -H "Authorization: Token token={api_token}" \ -X GET \
"https://js.callrail.com/api/v3/dni/trackers/session_numbers.json?tracker_ids[ ]=TRK8154748ae6bd4e278a7cddd38a662f4f&uuid=123e4567-e89b-12d3-a456-426614174000"

FIG. 5

Example:
curl -H "Authorization: Token token=\"{api_token}\""\
-X POST
-H "Content-Type: application/json" \
-d '{
"company_id":
"COM9vb5ab4e9a2f49d584f1eb198680egv6",
"landing_page_url": "https://example.com/?utm_course=brand&utm_medium=web&utm_campaign=srp",
"ref": "direct",
"user_agent": "Mozilla/5.0 (Macintosh; Intel Mac OS X 10.15; rv:105.0) Gecko/20100101 Firefox/105.0", "uuid": "bb62c3b6-7693-4941-953f-ca8b3a28a085",
}'\
"https://js.callrail.com/api/v3/dni/attribution.json"

FIG. 6

Example:
{
"trackers": {
"TRK8154748ae6bd4e278a7cddd38a662f4f": "+1903353000"
}
}

FIG. 7

```
def perform_number_assignments
  trackers = fetch_matching_trackers

# Perform local swap if any tracker has local swap set
  trackers.each ( |tracker| local_swap(tracker, nil) if tracker.local_swap )

# Filter them down to trackers that are tracking the given source
  tracker_ids = trackers
    .reject(&:local_swap)
    .map(6:id)
    .uniq these are the trackers that need numbers assigned from them
  @missing_trackers = tracker_ids - already_assigned(tracker_ids)

assign_numbers_from_trackers(@missing_trackers)
end

# These are our numbers to assign.
# If multiple requests for an overlapping set of numbers are made at the same time, it can trigger a
deadlock.
# P1 tries to acquire locks: [a, b,...] and blocks on P2 waiting for b
# P2 tries to acquire locks: [b, a,...] and blocks on P1 waiting for a

# This is not a direct analogue to SwapSessiontassign_numbers. We've rewritten it to try to do the
# important things in a single query and avoid a deadlock.

# @param [number] session_tracker_ids Trackers to assign numbers from.
def assign_numbers_from_trackers(session_tracker_ids)
  timestamp = Time.now.utc results = assign_numbers_from_trackers_query(session_tracker_ids)
  first = results.entries.first
  if first
    first_number = Number.find(first['id'])
```

FIG. 9A

```
# Assign a 'swapped_at' timestamp prior to the update we just did. Otherwise Pool Inspector
# would think that we went a milisecond between swaps. This works because we selected the old
# 'swapped_at' in update_sql, and because PoolInspector doesn't query for the record.
first_number.swapped_at = first[iswapped_ate]
end
PoolInspector.new(number: first_number).leak_detection if first_number
found = results.entries.map { |row| row('phone_numbere') }
NumberAssignment.track(found, session_manager.uuid, time: timestamp)
end
```

FIG. 9B

```
class PoolSizeAutoScaleWorker
  include Sidekiq::Worker
  sidekiq_options retry: true def perform(tracker_id)
    tracker = SessionTracker.find(trackerid)

return unless tracker.agency.has_feature?(:poolsizeautoscale)

cur_pool_size = tracker.pool_size
    new_pool_size = recommended_pool_size(tracker)
    max_pool_size = tracker.agency.plan_limit('keywordpoolsizemax')

if new_pool_size < max_pool_size
      update_pool_size(tracker, new_pool_size)
    elsif cur_pool_size <= max_pool_size && new_pool_size >= max_pool_size
      update_pool_size(tracker, max_pool_size)
      PoolAutoScaleMailer.max_pool_size_reached(tracker.id).deliver_now
    elsif cur_pool_size > max_pool_size
      PoolAutoScaleMailer.max_pool_size_reached(tracker.id).deliver_now
    end
  end
end
```

FIG. 10

```
# Either fill or reduce numbers from the pool as needed to hit the target pool size.
def adjust_pool_size
    count = actual_size
    return if actual_size == desired_size count > pool_size ? reduce : fill
end
```

FIG. 11A

```
#   Add numbers to the pool until it is full.
#   Will raise an exception if not enough numbers are available.
#   @param query [Hash] – optional search parameters.  See NumberProvider#search
def fill (query = nil)
    return if tracker.disabled?
    until full?
        numbers = tracker.available_numbers (query)
        raise SessionTracker::InsufficientNumbers.new(tracker, querry || tracker.default_number_query) if numbers.empty?

numbers.each do |num|
            break if actual_size >= desired_size
            add_available_number(num)
        end
    end this will only trigger if the tracker is disabled while filling
    tracker.reload if tracker.disabled?
        tracker.numbers.each do |tn|
            tn.disable! if tn.can_disable
        end
    end
ensure
    update_swappy
end
```

SYSTEM AND METHODS FOR MANAGEMENT DYNAMIC NUMBER INSERTION POOLS

CROSS-REFERENCE TO RELATED APPLICATIONS

The present application is a continuation application of U.S. application Ser. No. 18/187,394 filed on Mar. 21, 2023, which claims priority to and benefit of U.S. Provisional Application No. 63/483,657 filed Feb. 7, 2023, the disclosures of which are hereby incorporated by reference herein in their entireties.

BRIEF DESCRIPTION OF THE DRAWINGS

FIG. 1 depicts example HTTP methods which may be used for API endpoints in accordance with an embodiment.

FIG. 2 illustrates various HTTP status codes that may be returned in accordance with an embodiment.

FIG. 3 illustrates example default rate limits in accordance with an embodiment.

FIG. 5 depicts example code including an API call to receive a swapped number for a webpage in accordance with an embodiment.

FIG. 6 depicts example code for passing attribution data through an API in accordance with an embodiment.

FIG. 7 depicts example code for receiving a swapped number or tracking information in accordance with an embodiment.

FIGS. 9A and 9B depict example code for performing a server-side dynamic number insertion swap in accordance with an embodiment.

FIG. 10 depicts example code for pool auto-scaling in accordance with an embodiment.

FIGS. 11A and 11B depict example code for adjusting a pool to match a target size in accordance with an embodiment.

DETAILED DESCRIPTION

Figure 4:
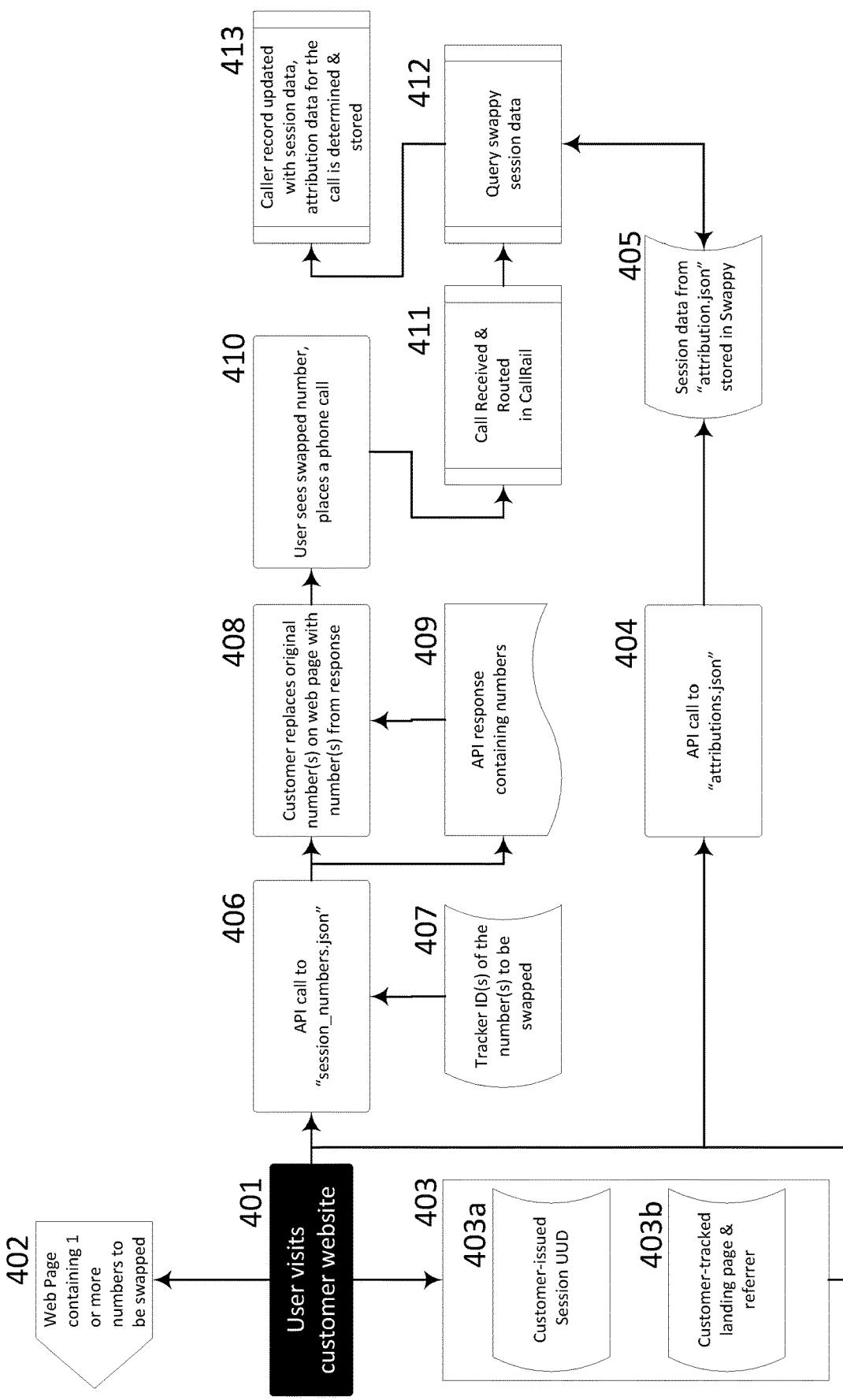
FIG. 4 illustrates a process for server-side swap in accordance with an embodiment.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Server-Side Swap API

Dynamic Number Insertion (DNI) can be an accurate way to track consumers who call your business after discovering your number from an advertising source. Dynamic numbers allow marketers to discover all the actions a user took before calling (e.g., clicked a pay per click (PPC) advertisement, visited a specific landing page, viewed a retargeted advertisement, etc.). A system can assign a unique phone number to each online source and then display that phone number to visitors who arrive at your website via that specific source. These sources can include things like organic search, PPC ads, Yelp, or anywhere else your business has a presence online. The data can then be fed to a Google Analytics account for a user to review after receiving calls. With DNI, a system can determine which advertisements, keywords, and online content can tie into generating inbound calls to properly track marketing attribution.

In some embodiments, customers can implement DNI by installing a JavaScript Snippet directly on their website. Alternatively, some customers may need to control the number swapping on their own web apps, mobile apps, and/or websites. Mobile apps may not support JavaScript and first-party cookies used to support the JavaScript Snippet, and therefore, may require a separate solution. Some organizations with high levels of data security/sensitivity (e.g., organizations in the Healthcare industry) may have policies restricting the installation of third-party JavaScript on their website and/or the installation and tracking of cookies by a third party, even if for first-party use. For these organizations, the JavaScript snippet installation may be prohibited. In those cases, DNI can be implemented using a Server-Side Swap API.

A Server-Side API can provide a method to programmatically request the number(s) that should be swapped for a given web session and can provide the web session and/or attribution information associated with a user's session should they make a phone call to the number assigned through DNI. Attribution information can include user classification data such as, for example, a login, account number, name, and/or user type (e.g., account holder). Attribution information can include search data associated with the user. Attribution information can include brand interaction by the user. Attribution information can include previous system interactions (e.g., a previously assigned number swap or times the user has visited). Attribution information can include a referral source for the visit (e.g., Google Ads). The Server-Side API can select a number for the swap based on the attribution information. The Sever-Side API can be used by developers and customers looking to integrate DNI directly on their site. The Server-Side API can require a web and/or mobile app developer to implement the number swapping (e.g., making one or more API calls). In some embodiments, any calls to a number that were "swapped" via this method may be tracked and attributed with visitor-level tracking. The resulting implementation may produce indistinguishable results of a website pool and the JavaScript Snippet, as referenced herein.

The Server-Side API can aid data-driven marketers in measuring the performance of their campaigns by providing multi-channel attribution. These analytics can give users the insight they need to optimize their advertising campaigns, increase sales effectiveness, and improve customer retention.

Source trackers can associate a single tracking number to a certain set of customers based on how they found the number. For example, a single source tracker can be used to identify website visitors who came from facebook.com, who found the site from a paid Google search, or via an offline source such as a billboard or TV advertisement.

Session trackers can serve one number from a pool of tracking numbers to website visitors, which can allow the system to associate calls with individual visitors. The system can allow creation a pool of telephone numbers that belong exclusively to a specific business for visitor tracking and can dynamically swap them using the JavaScript Snippet, and/or an implementation of the Server-Side Swap API.

A destination number can be a number associated with a phone which can ring when customers dial a tracking number. This can be a primary business phone number associated with a client.

A tracker can be a generic term applied to any source tracker or session tracker/website pool. A Tracker ID can uniquely represent a given tracker.

The system can use API keys to authenticate and/or authorize requests being made to the API. These API keys can be scoped to individual users and can have access to the same data as the user who created the key. API responses may only include data pertaining to the user's API key. In some embodiments, the system may require that the key used to make requests to the Server-Side Swap endpoint must be owned by a user with Administrator access to the account (e.g., keys owned by Manager or Reporting Users may not be able to make requests).

The API can authenticate via the HTTP Authorization header; Authorization: Token token="YOUR_API_KEY". In some embodiments, the system can require that all requests to all API endpoints require an API key to be provided.

The Server-Side Swap API can adhere to REST architectural principles. REST (Representational State Transfer) can take advantage of HTTP methods to create, read, update, and delete (CRUD) resources on cloud applications.

The Server-Side Swap API can send and receive data in JSON format. JSON (JavaScript Object Notation) can be completely language independent and/or can use human-readable text to send data objects consisting of key-value pairs.

FIG. 1 depicts example HTTP methods which may be used for API endpoints. Each API endpoint can require a correct HTTP method, endpoint URL, and/or end-point specific request parameters.

The API can return standard HTTP success or error status codes. For errors, extra information about what went wrong can be encoded in the response as JSON. FIG. 2 illustrates various HTTP status codes that may be returned.

The system can limit the number of requests to the API made by an account on an hourly and/or daily basis.

The system can include default rate limits. FIG. 3 illustrates example default rate limits. In some embodiments, if an application exceeds the rate limit, all endpoints may return the HTTP 429 response code. Applications can detect this code and react by pausing or slowing requests until the 429 clears.

FIG. 4 illustrates a process for server-side swap in accordance with an embodiment. The process may include a user visiting a customer website 401. The website may contain one or more numbers to be swapped 402. Referring briefly to FIG. 5, example code (including an API call to receive a swapped number for a webpage) is depicted in accordance with an embodiment. Referring briefly to FIGS. 9A and 9B, example code for performing a server-side dynamic number insertion swap is depicted in accordance with an embodiment.

Referring back to FIG. 4, the customer session may be identified by a universally unique identifier (UUID) 403a. In some embodiments, the UUID may be generated on the customer's server 403. In other embodiments, the UUID may be generated on the user device or the swap service. The customer's server 403 may track the landing page and/or referrer 403b of the user.

An API may be made to post the collected attribution data 404. Referring briefly to FIG. 6, example code for passing attribution data through an API is depicted in accordance with an embodiment. Referring back to FIG. 4, session data including the attribution information may be stored for association with a later call 405.

In response to the user visiting the customer website 401, an API call may generate a session 406 based on a series of tracker identification numbers associated with the customer 407 and/or specific use case. The customer can receive an API response containing the numbers and/or tracking information 409 and can insert the number(s) into the webpage 408. The number(s) may replace default numbers. Referring briefly to FIG. 7, example code for receiving a swapped number or tracking information is depicted in accordance with an embodiment.

Referring back to FIG. 4, a user may see the swapped number and place a call 410. The call may be received and routed to the customer 411. The session data 412 can be queried and updated with the caller record updated with session data and attribute data 413.

In some embodiments, a system for dynamic number insertion may include at least one application operable on at least one client device and at least one public facing API operable on at least one server, the at least one API configured to receive a request for a phone number swap including attribution information from the at least one client device; provide a phone number based on the attribution information to the at least one client device; receive notification of a phone call made to the phone number; or attribute the phone call based on the attribution information; or any combination thereof. The at least one application can be interfaced to the at least one public facing API.

Website Pool Auto-Scaling

Website pool auto-scaling can help customers that use website pools to get visitor-level tracking and/or attribution for their phone calls. Having enough numbers in a website pool can be critical to accurate tracking. With an undersized pool, the numbers may cycle too fast, which can increase the risk that a phone call is attributed to the wrong visitor session. If the pool is undersized enough, numbers can stop swapping altogether for new visitors. As a result, any calls from those sessions may not be tracked at all (i.e., they go to the main business number).

Auto-scaling can allow the system to track "risky swaps" and indicate that a given pool may not have enough numbers to assign to all visitors at peak times. When enough risky swaps are detected, the system may automatically add numbers to the website pool to reduce the risk of misattribution and missed calls. The system can calculate how many numbers to add to the pool based on the same risky swap detection that tells us the pool is too small.

The system may automatically scale website pools for customers, automatically adjusting the quantity of numbers in the pool when traffic increases or decreases and notifying the customer of the change in size. In other words, the system may detect when too many swaps are occurring, then if so, increase the pool size. The system may notify someone internally (e.g., flag the change) and/or the customer when the pool size changed.

A method of recommending a pool size, in accordance with an embodiment, is provided. A number assignment page can be accessed. A pool size recommendation endpoint can be queried. In some embodiments, recommendations can be shown only if the session tracker has a risky swap alert (i.e., an App Notice) otherwise, the response can be a default (e.g., null).

An assignment snapshot can be generated. The assignment snapshot can be in the form of a hash. The assignment snapshot can include the total sum of all assignments for a tracker, the number of unique days with assignments, and/or the average of all the max assignments for the relevant span of days.

A recommended size of the pool can be generated. The recommended size can be based on any combination of the following: the pool size of active numbers multiplied by a constant (e.g., 1.1) or the forecasted daily peak average from the assignment snapshot divided by a constant (e.g., 4). The recommended pool size can be the maximum of the above referenced values. The recommended pool size can be rounded up to the nearest whole number.

In some embodiments, the system does not show a recommended size of less than the current pool size number. The forecast can be an arbitrary calculation based on what support currently suggests. The forecasted daily peak average can be similar or equivalent to "the average peak amount of visitors to the client website and/or application over a period of time (e.g., every 10 minutes, hourly, daily).

The detection of risky swaps may also play a role in recommending a pool size. A risky swap can be the re-use of a phone number, in a swap, within a limited period of time (e.g., 5 minutes). If a threshold value of risky swaps is occurring within a period of a time, the reliability of the attribution of calls using those phone numbers may be in question. In some embodiments, the detection of a threshold of risky swaps may trigger a recommendation of a new pool size and/or automatically adjust the pool size. Auto-scaling the pool may include purchasing new phone numbers to include in the pool. The new phone numbers may be chosen based on predetermined criteria such as area code.

As numbers are assigned in a swap, a function can be called to check for risky swaps. A risky swap threshold can be calculated as the number of risky swaps divided by the session tracker's risk threshold. The session tracker's risk threshold may be based on the pool size.

The system can be configured to perform one or more automatic responses to a customer reaching a risky swap threshold. The response can include notifying the system administrators and/or the customer. Notifications can also be sent for single instances of a risky swap. For example, the system may automatically notify system administrators on a single risky swap and the customer at the risky swap threshold.

For the detection of risky swaps, number assignment rollup can be stored in-memory (e.g., redis) and/or a database. In some embodiments, number assignments can be tracked in memory for a period of time (e.g., 4 hours) and transferred to a database for permanent or semipermanent storage.

Similar processes may be used to detect low cycling of numbers in a DNI pool. A new lower pool size may be recommended and/or the pool size may be automatically scaled down. Scaling down a DNI pool may include flagging a number for removal from the client pool after a predetermined period of time. If a new call is made from the flagged number (e.g., a user saved the number and used it later), the period of time may be extended. In some embodiments, the number can be removed from the pool only after the period elapses. In this manner a customer can minimize saved numbers going inactive.

Figure 8A:
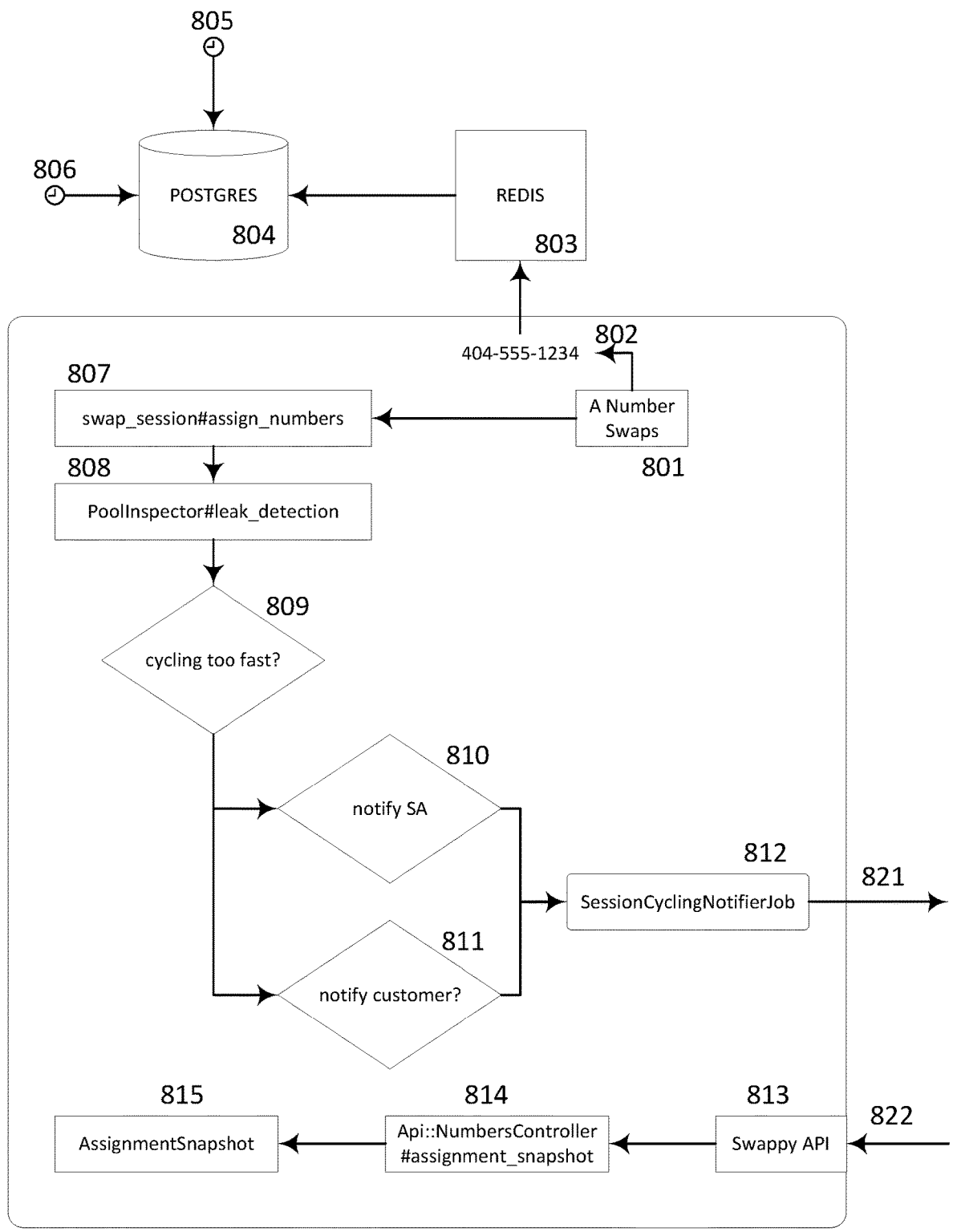
FIGS. 8A and 8B depict an illustrative system diagram for risky swap detection and recommending pool size in accordance with an embodiment.
Figure 8B:
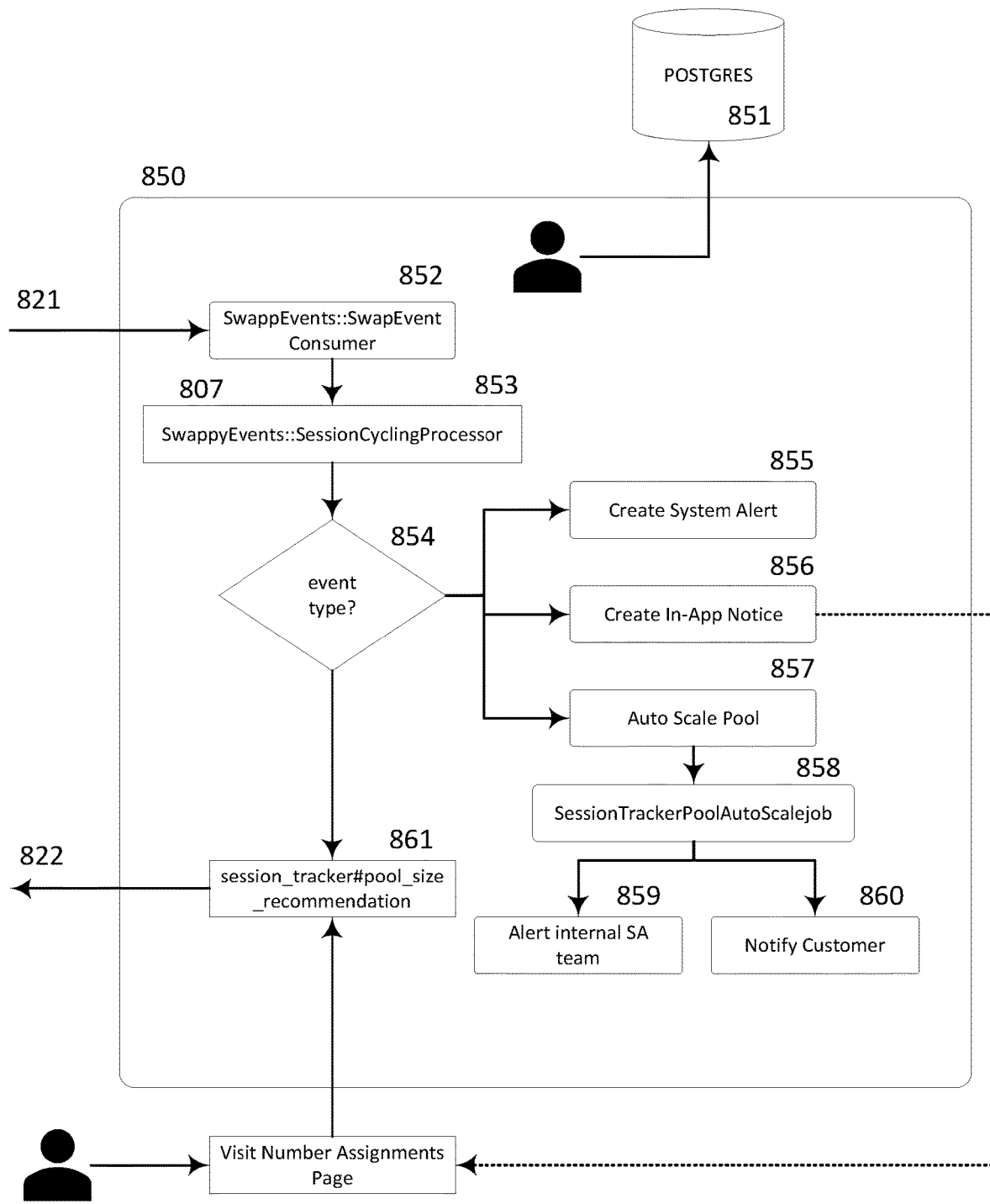

FIGS. 8A and 8B depict an illustrative system for risky swap detection and recommending pool size. The system may include one or more environments running on one or more processors. The processors may be incorporated in one or more data processing systems as referenced in FIG. 12.

FIG. 8A illustrates an environment for risky swap detection 800 in accordance with an embodiment. When a number swaps 801, the number 802 swap can be cached 803 (e.g., using redis). The number swaps may be periodically 805 rolled-up and stored in a database 804 (e.g., postgres). For example, the period may be daily (e.g., each night). Old records may be removed from the database 804 periodically 806. For example, the period 806 may be weekly. Schedules may be tailored to an individual customer based on the frequency of number swaps throughout a timeframe.

As numbers are being assigned 807, the system may determine how often the number has been used as a swap within a predefined timeframe 808. In response to determining a number is being used to often 809, the system may notify the system administrator 810 and/or the customer 811. In some embodiments, a different threshold of swaps may be used to trigger a notification to a system administrator 810 versus a customer 811. For example, the system administrator 810 may be notified at a lower threshold than the customer 811. The notification processes 810/811 may be parallel.

In some embodiments, a separate environment 850, as illustrated in FIG. 8B, may manage auto-scaling the pool. A notifier job 812 may notify 821 through a message broker (e.g., RabbitMQ) the second environment 850 of the risky swap detection 852. The system may analyze the risky swaps 853 to determine an event type 854. The event types 854 may include creating a system alert 855 to an internal support team, creating a notice to the customer 856 (e.g., in-app, email, text, etc), or auto-scaling the pool 857.

A process may be performed to auto-scale the pool 858, as described above. Auto-scaling the pool may trigger a notification to system administrators 859 or the customer 860. Referring briefly to FIG. 10, example code for pool auto-scaling is depicted in accordance with an embodiment. Referring briefly to FIGS. 11A and 11B, example code for adjusting a pool to match a target size is depicted in accordance with an embodiment.

Referring back to FIG. 8B, a customer may opt-in or out of auto-scaling. A customer's opt-in status may be stored in a database 851. A customer may interact with an app or website 862 to manually deny or accept a recommended change in pool size 861.

The manual selection of the customer 861 may trigger a call 822 to the first client 800 to determine a recommended value. A controller 814 may generate an assignment snapshot 815 as discussed herein. Similar processing may be performed when auto-scaling the pool.

In some embodiments, a system for managing dynamic number insertion pools can comprise at least one processor configured for doing any or any combination of the following: tracking re-use of a phone number in swaps, associated with a client pool, over a first period of time; based on the re-use, generating a risky swap value for the client pool; in response to the risky swap value reaching a threshold, generating an assignment snapshot comprising a combination of a total sum of all assignments for a tracker, a number of unique days with assignments, or an average of all the max assignments; and generating a recommended value for a pool size based on the assignment snapshot.

Figure 12:
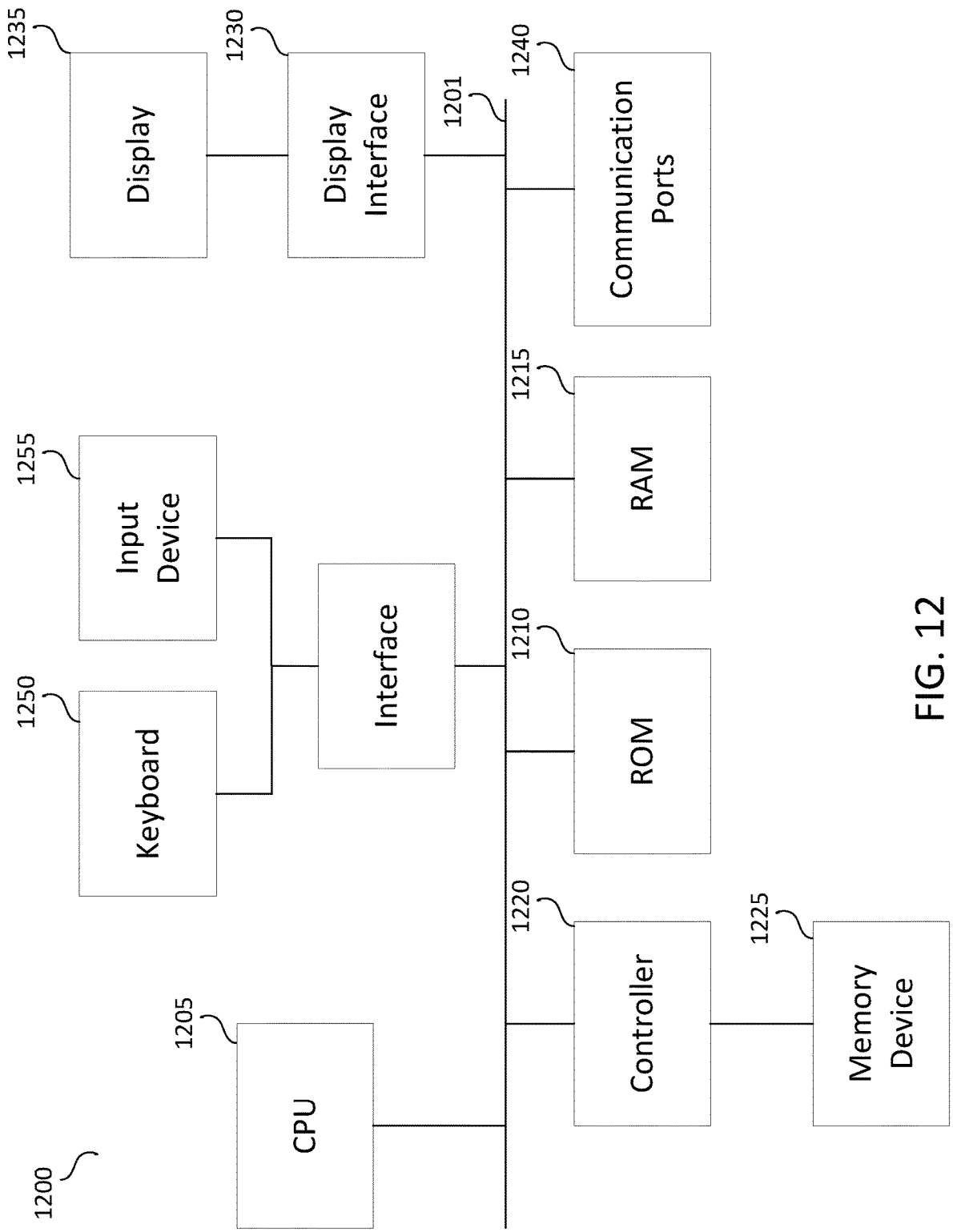
FIG. 12 depicts a block diagram of exemplary data processing system comprising internal hardware that may be used to contain or implement various computer processes and systems.

FIG. 12 depicts a block diagram of exemplary data processing system 1200 comprising internal hardware that may be used to contain or implement the various computer processes and systems as discussed above. In some embodiments, the exemplary internal hardware may include or may be formed as part of a database control system. A bus 1201 can serve as the main information highway interconnecting the other illustrated components of the hardware. CPU 1205 can be the central processing unit of the system, performing calculations and logic operations required to execute a program. CPU 1205 can be an exemplary processing device, computing device or processor as such terms are used within this disclosure. Read only memory (ROM) 1210 and random access memory (RAM) 1215 constitute exemplary memory devices.

A controller 1220 can interface with one or more optional memory devices 1225 via the system bus 1201. These memory devices 1225 may include, for example, an external or internal DVD drive, a CD ROM drive, a hard drive, flash memory, a USB drive or the like. As indicated previously, these various drives and controllers are optional devices. Additionally, the memory devices 1225 may be configured to include individual files for storing any software modules or instructions, data, common files, or one or more databases for storing data.

Program instructions, software or interactive modules for performing any of the functional steps described above may be stored in the ROM 1210 and/or the RAM 1215. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 1230 can permit information from the bus 1201 to be displayed on the display 1235 in audio, visual, graphic, or alphanumeric format, or any combination thereof. Communication with external devices can occur using various communication ports 1240. An exemplary communication port 1240 can be attached to a communications network, such as the Internet or a local area network.

The hardware can also include an interface 1245 which can allow for receipt of data from input devices such as a keyboard 1250 or other input device 1255 such as a mouse, a joystick, a touch screen, a remote control, a pointing device, a video input device and/or an audio input device.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A system for managing dynamic number insertion pools, the system comprising:
   at least one processor configured for:
   tracking re-use of a phone number in swaps, associated with a client pool, over a first period of time, wherein the client pool is a list of phone number associated with a client;
   based on the re-use, generating a risky swap value for the client pool;
   in response to the risky swap value reaching a threshold, generating an assignment snapshot comprising a combination of a total sum of all assignments for a tracker, a number of unique days with assignments, or an average of all max assignments; and
   generating a recommended value for a pool size based on the assignment snapshot;
   wherein an assignment is an allocation of a specific phone number from the client pool; and
   wherein a max assignment is a maximum time a specific phone number of the client pool has been assigned.

2. The system of claim 1, wherein the at least one processor is further configured for:
   automatically adding numbers to the dynamic number insertion pools based on the recommended value for the pool size.

3. The system of claim 2, wherein the at least one processor is further configured for: purchasing additional phone numbers based on predetermined pool criteria.

4. The system of claim 1, wherein the at least one processor is further configured for:
   in response to the re-use over a second period of time being below a threshold value, generating a recommended value for the pool size.

5. The system of claim 4, wherein the at least one processor is further configured for:
   flagging a number for removal from the client pool after a third period of time;
   in response to receiving a call from the number, extending the third period of time; and
   removing the number from the client pool after the third period of time.

6. The system of claim 1, wherein the assignment snapshot is a hash.

7. The system of claim 1, wherein generating a recommended value for a pool size based on the assignment snapshot further comprises at least one of:
   determining an increased active size based on a current pool size multiplied by a constant; or
   determining a forecasted size based on the assignment snapshot.

8. The system of claim 7, wherein generating a recommended value for a pool size based on the assignment snapshot further comprises selecting a larger value of the increased active size and the forecasted size.

9. The system of claim 7, wherein the forecasted size is an average peak amount of visitors to a website or application.

10. The system of claim 1, wherein the threshold is measured over a period of five minutes.

11. A method for managing dynamic number insertion pools, the method comprising:
    tracking, by at least one processor, re-use of a phone number in swaps, associated with a client pool, over a first period of time, wherein the client pool is a list of phone number associated with a client;
    based on the re-use, generating, by the at least one processor, a risky swap value for the client pool;
    in response to the risky swap value reaching a threshold, generating, by the at least one processor, an assignment snapshot comprising a combination of a total sum of all assignments for a tracker, a number of unique days with assignments, or an average of all max assignments; and
    generating, by the at least one processor, a recommended value for a pool size based on the assignment snapshot;
    wherein an assignment is an allocation of a specific phone number from the client pool; and
    wherein a max assignment is a maximum time a specific phone number of the client pool has been assigned.

12. The method of claim 11, further comprising:
    automatically adding numbers to the client pool based on the recommended value for the pool size.

13. The method of claim 12, further comprising:
    purchasing additional phone numbers based on predetermined pool criteria.

14. The method of claim 12, further comprising:
    in response to the re-use over a second period of time being below a threshold value, generating a recommended value for the pool size.

15. The method of claim 14, further comprising:
    flagging a number for removal from the client pool after a third period of time;
    in response to receiving a call from the number, extending the third period of time; and
    removing the number from the client pool after the third period of time.

16. The method of claim 12, wherein the assignment snapshot is a hash.

17. The method of claim 12, wherein generating a recommended value for a pool size based on the assignment snapshot further comprises at least one of:
    determining an increased active size based on a current pool size multiplied by a constant; or
    determining a forecasted size based on the assignment snapshot.

18. The method of claim 17, wherein generating a recommended value for a pool size based on the assignment snapshot further comprises:
    selecting a larger value of the increased active size and the forecasted size.

19. The method of claim 17, wherein the forecasted size is an average peak amount of visitors to a website or application.

20. The method of claim 12, wherein the threshold is measured over a period of five minutes.

\* \* \* \* \*